United States Patent
Vonnegut et al.

(10) Patent No.: US 6,780,134 B2
(45) Date of Patent: Aug. 24, 2004

(54) TORQUE TRANSFER CLUTCH WITH BALL SCREW ACTUATOR

(75) Inventors: Carl H. Vonnegut, Newton, MA (US); Mozaffar Khazaee, Baldwinville, NY (US); Sankar K. Mohan, DeWitt, NY (US); Eric A. Bansbach, Fayetteville, NY (US); Daniel J. Miller, Manlius, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/385,321

(22) Filed: Mar. 10, 2003

(65) Prior Publication Data

US 2003/0224894 A1 Dec. 4, 2003

(Under 37 CFR 1.47)

Related U.S. Application Data

(63) Continuation-in-part of application No. 10/263,245, filed on Oct. 2, 2002, which is a continuation of application No. 09/775,089, filed on Feb. 1, 2001, now Pat. No. 6,484,857.

(51) Int. Cl.$^7$ .............................................. F16H 37/08
(52) U.S. Cl. ........................ 475/204; 192/35; 192/84.6; 192/94; 475/201; 475/206
(58) Field of Search .......................... 192/35, 84.6, 92, 192/94; 180/233, 248, 249, 250; 475/204, 201, 206, 248

(56) References Cited

U.S. PATENT DOCUMENTS

| | | | |
|---|---|---|---|
| 2,091,268 A | 8/1937 | Colman | |
| 3,178,958 A | 4/1965 | Beck | |
| 3,507,374 A | 4/1970 | Allaben, Jr. | |
| 4,590,816 A | 5/1986 | Weyer | |
| 4,635,904 A | 1/1987 | Whittingham | |
| 4,718,303 A | 1/1988 | Fogelberg | |
| 4,989,686 A | 2/1991 | Miller et al. | |
| 5,199,325 A | 4/1993 | Reuter et al. | |
| 5,332,060 A | 7/1994 | Sperduti et al. | |
| 5,407,024 A | 4/1995 | Watson et al. | |
| 5,462,496 A | 10/1995 | Dick et al. | |
| 5,655,618 A | 8/1997 | Wilson et al. | |
| 5,910,061 A | 6/1999 | Organek et al. | |
| 5,943,919 A | 8/1999 | Babinski | |
| 6,062,330 A | 5/2000 | Watson et al. | |
| 6,167,997 B1 | 1/2001 | Keeney | |
| 6,484,857 B2 * | 11/2002 | Vonnegut et al. | 192/35 |
| 6,645,109 B2 * | 11/2003 | Williams et al. | 475/204 |
| 6,698,565 B2 | 3/2004 | Cool et al. | |
| 2003/0024789 A1 * | 2/2003 | Vonnegut et al. | 192/84.6 |

OTHER PUBLICATIONS www.powerjacks.com/Duff–Norton/Ball Screw Actuators/ pp. 1–6.

www.powerjacks.com/Duff–Norton/Ball Screw Actuators/ pp. 1–2.

* cited by examiner

Primary Examiner—Saúl J. Rodriguez
(74) Attorney, Agent, or Firm—Harness, Dickey & Pierce P.L.C.

(57) ABSTRACT

The present invention is directed to a power transfer system for a four-wheel drive vehicle equipped with a torque transfer coupling which includes a clutch pack and a ball-screw actuator. The ball-screw actuator functions to axially translates an apply plate to operatively engage the clutch pack and vary the frictional engagement. This arrangement yields numerous operational advantages over the prior art including, but not limited to, establishing a direct drive between the motor output shaft and the apply plate, concentric mounting of the actuator elements with the motor output shaft, and a simplified mechanical arrangement that reduces the number of frictional elements increasing operational efficiency and decreasing motor.

19 Claims, 8 Drawing Sheets

TORQUE TRANSFER CLUTCH WITH BALL SCREW ACTUATOR

CROSS-REFERENCE TO RELATED APPLICATIONS

This application is a continuation-in-part of U.S. Ser. No. 10/263,245, filed Oct. 2, 2002 which is a continuation of U.S. Ser. No. 09/775,089, filed Feb. 1, 2001, now U.S. Pat. No. 6,484,857.

FIELD OF THE INVENTION

The present invention relates generally to power transfer systems for controlling the distribution of drive torque between front and rear wheels of a four-wheel drive vehicle and, more particularly, to a torque transfer coupling equipped with a ball-screw actuator.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical "mode" shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement.

Conventional clutch assemblies, typically include a clutch pack operably connected between a drive member and a driven member, and a power-operated actuator for controlling engagement of the clutch pack. Specifically, torque is transferred from the drive member to the driven member by actuating the power-operated actuator for displacing an apply plate which acts on the clutch pack and increases the friction of engagement between the interleaved plates.

A variety of power-operated actuators have been used in the art with mixed results. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, which includes a linear actuator that is operable for pivoting a lever arm to control the magnitude of the clutch engagement force applied to the clutch pack. While the above clutch actuator devices have performed adequately for their intended purpose, a need exists for an improved actuator that is less complex and reduces the number of friction generating components which lead to inefficiencies and larger motor requirements.

SUMMARY OF THE INVENTION

In view of the above, the present invention is directed to a power transfer system for a four-wheel drive vehicle having a torque transfer coupling equipped with a clutch pack and a ball-screw actuator. The ball-screw actuator functions to axially translates an apply plate for operatively engaging the clutch pack and varying the frictional engagement. This arrangement yields numerous operational advantages over the prior art including, but not limited to, establishing a direct drive between the motor output shaft and the apply plate, concentric mounting of the actuator elements with the motor output shaft, and a simplified mechanical arrangement that reduces the number of frictional elements increasing operational efficiency and decreasing motor requirements.

Further areas of applicability of the present invention will become apparent from the detailed description provided hereinafter. However, it should be understood that the detailed description and specific examples, while indicating preferred embodiments of the invention, are intended for purposes of illustration only, since various changes and modifications within the spirit and scope of the invention will become apparent to those skilled in the art from the following detailed description, attached drawings and claims.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle. In operation, the amount of power (i.e., drive torque) transferred to the non-driven wheels is controllably regulated in accordance with various system and driver-initiated inputs for optimizing the tractive characteristics of the vehicle while concomitantly enhancing overall steering control. In addition, the power transfer system may also include a mode select mechanism for permitting a vehicle operator to select between a two-drive wheel mode, a part-time four-wheel drive mode, and an "on-demand" drive mode.

Figure 1:
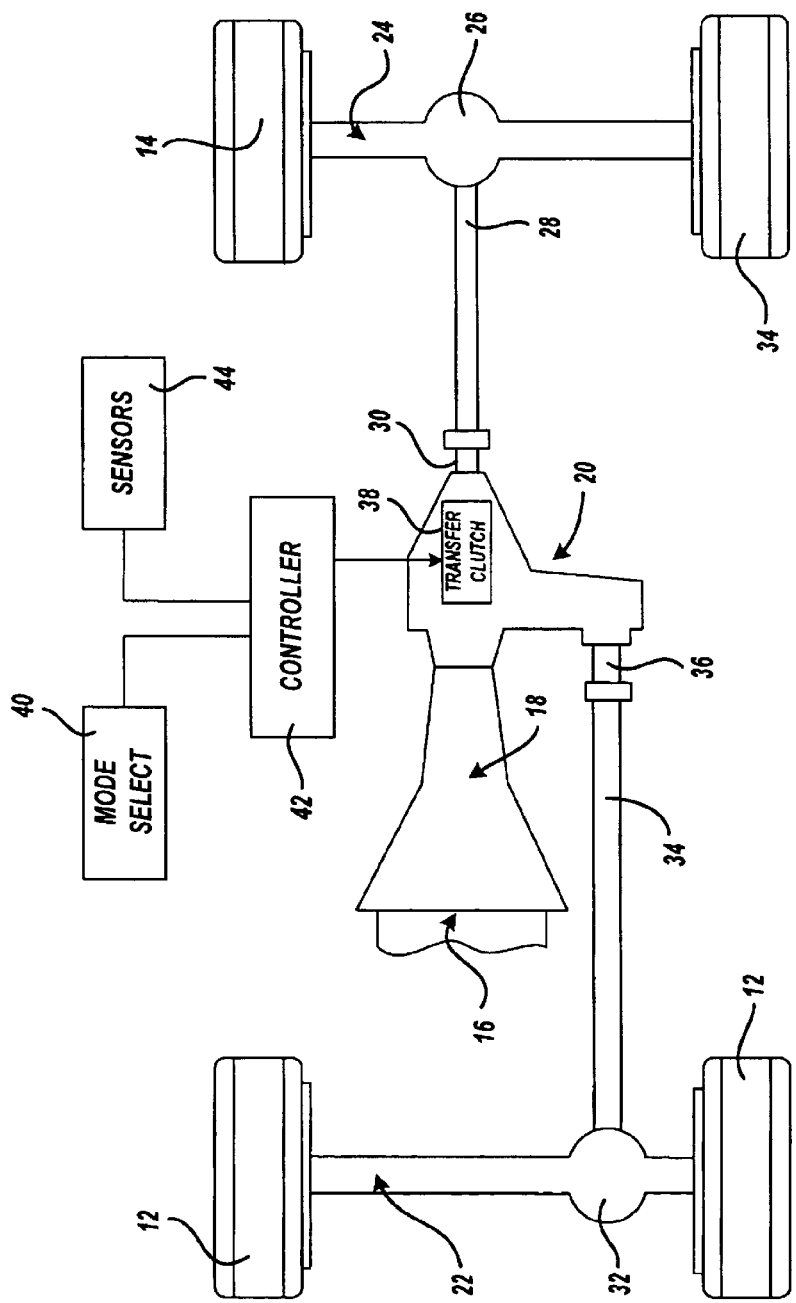
FIG. 1 is a schematic representation of an exemplary four-wheel drive vehicle having a power transfer system according to the present invention.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a section output member 36 of transfer case 20. It is to be understood that the specific orientation of the drivetrain is merely exemplary in nature and that the drivetrain could be reversed for normally driving front wheels 12.

Transfer case 20 is equipped with a transfer clutch 38 for selectively delivering drive torque to front wheels 12 (i.e., the non-driven wheels) for establishing a four-wheel drive mode of operation. The operating mode of transfer clutch 38 is generally controlled in response to a mode signal generated by a mode selector 40 and which is sent to a controller 42. Controller 42 also receives input signals from sensors 44 that are indicative of various operational characteristic of the vehicle.

When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated and maintained in a "lock-up" condition such that second output member 36 is, in effect, rigidly coupled for driven rotation with first output member 30. When the "on-demand" drive mode is selected, controller 42 controls the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated condition of transfer clutch 38 to provide superior handling and steering control by minimizing the oversteer and understeer tendencies of the vehicle during a cornering maneuver. Other advantages associated with controllably modulating the actuated state of transfer clutch 38 will be detailed hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

Figure 2:
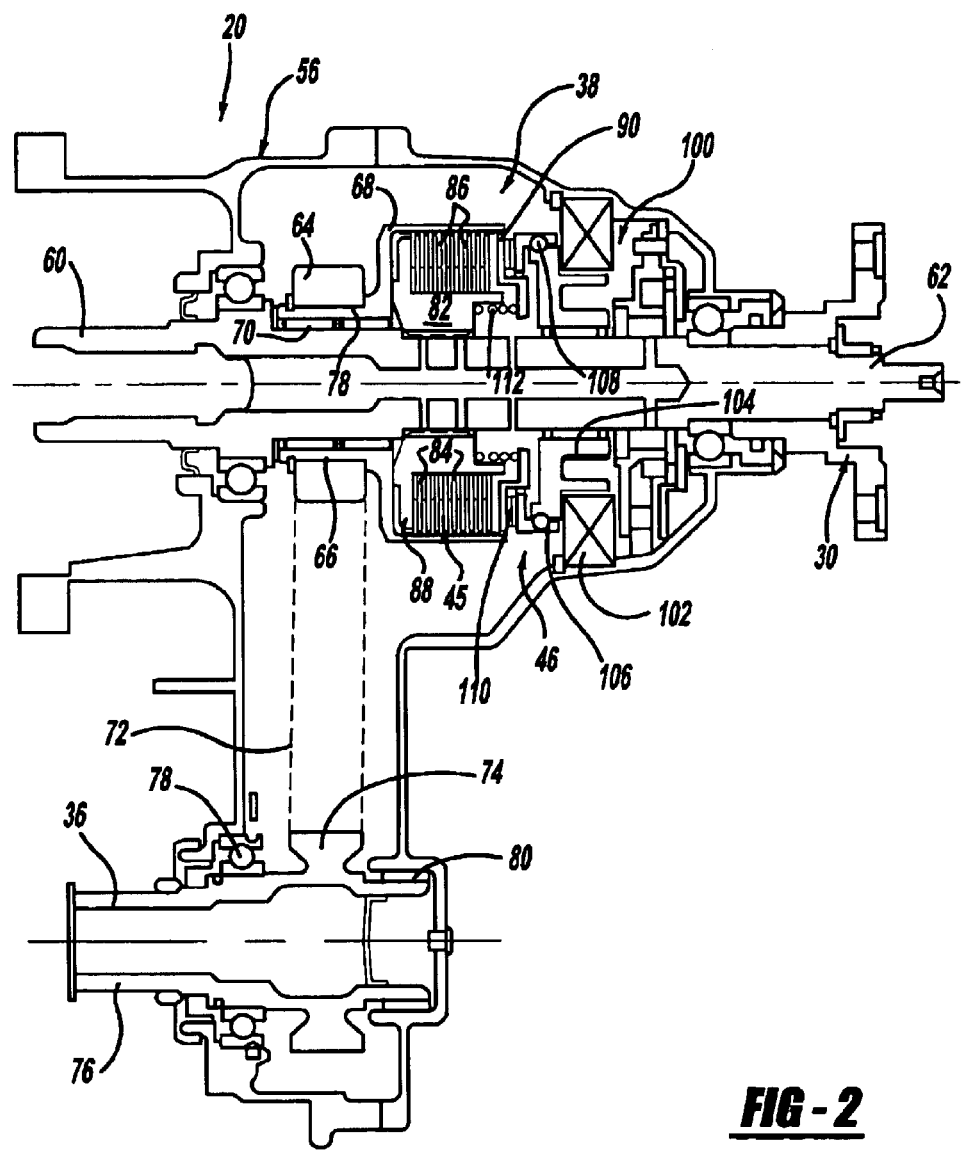
FIG. 2 is a cross-sectional view of a transfer case associated with the power transfer system and which includes a multi-plate clutch assembly and an electronically-controlled ball-screw actuator.
Figure 3:
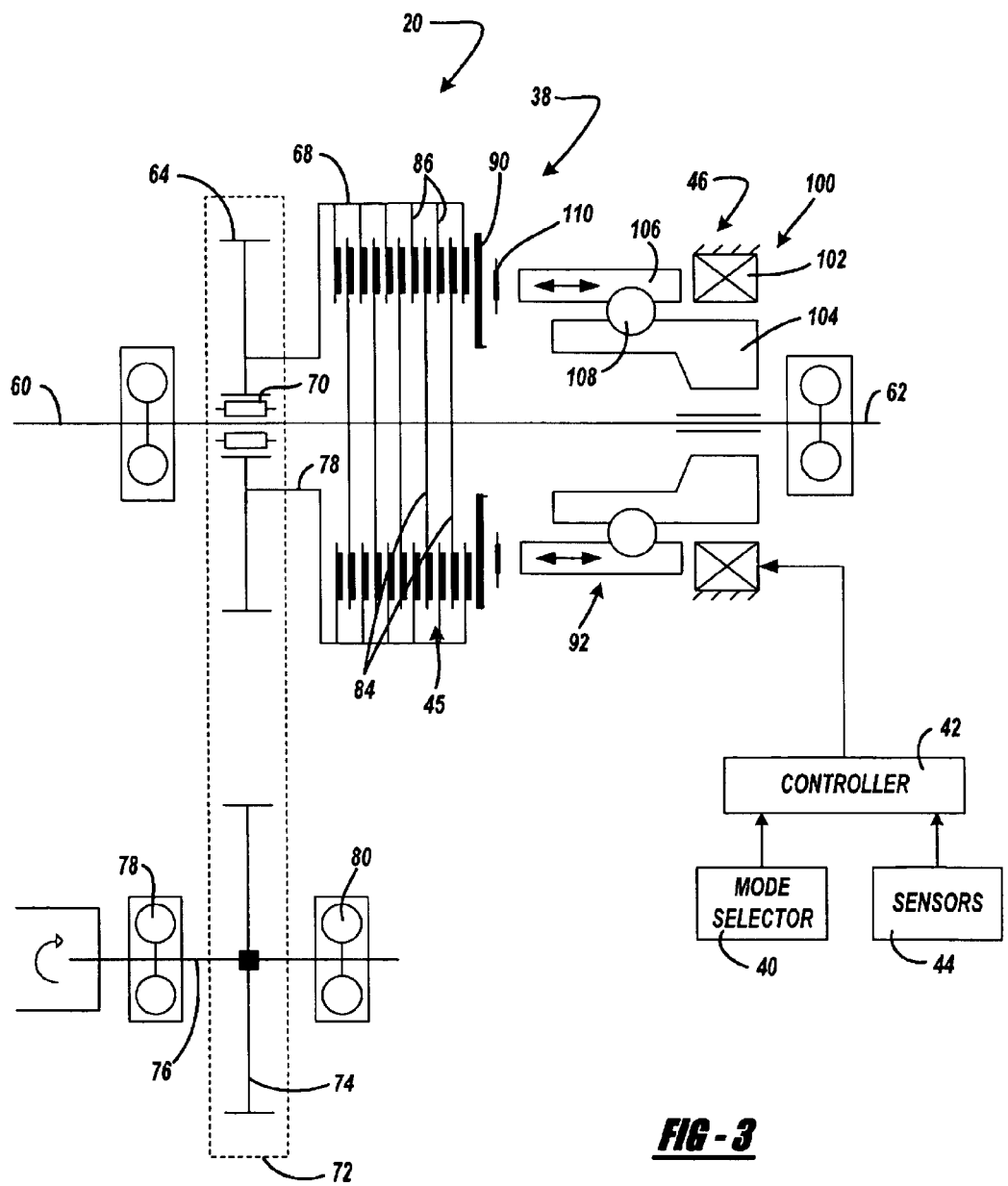
FIG. 3 is a schematic representation of the transfer case shown in FIG. 2.

Referring primarily to FIGS. 2 and 3, transfer case 20 includes a housing 56 formed by a series of modular sections that are suitably interconnected in a conventional manner. A transmission output shaft couples transmission 18 to an input shaft 60 of transfer case 20 for supplying power thereto. In the embodiment shown, first output member 30 includes an elongated mainshaft 62 which is aligned on the longitudinal axis of input shaft 60 and is supported for rotation within housing 56. For simplicity, the illustrated embodiment shows input shaft 60 extending as a mainshaft through transfer case 20 to form first output member 30. However, those skilled in the art will appreciate that a variety of intermediate sleeves or shafts splined to rotate with one another may be used to drivably couple a separate input shaft 60 for rotation with output shaft 62. An exemplary illustration of such a shaft and sleeve arrangement is described in detail in U.S. Pat. No. 5,332,060 which is hereby expressly incorporated into this description by reference.

With continued references to FIGS. 2 and 3, transfer clutch 38 is shown for transferring drive torque from input shaft 60 to front wheels 12. More specifically, a drive sprocket 64 is fixed (i.e., splined) for rotation on a tubular extension 78 of a rotatable cylindrical drum 68 associated with transfer clutch 38. In addition, extension 78 is rotatably supported on input shaft 60 by one or more suitable bearing assemblies 70. Drive sprocket 64 drivingly engages a chain 72 which is coupled to a lower driven sprocket 74. Driven sprocket 74 is coupled to, or an integral portion of, second output member 36 of transfer case 20. Second output member 36 is shown as a front output shaft 76 which is supported for rotation within housing 56 by suitable bearing assemblies 78 and 80. As noted, front output shaft 76 is operably connected to the motor vehicle's front wheel 12 via front drive shaft 34.

Transfer clutch 38 includes a multi-plate clutch assembly 45 and a power-operated actuator 46 that are arranged to concentrically surround a portion of input shaft 60. As noted, cylindrical drum 68 is fixedly secured to drive sprocket 64 so as to drive, or be driven by, front output shaft 76 of transfer case 20. In a preferred form, clutch assembly 45 includes a clutch hub 82 that is concentrically surrounded by drum 68 and which is fixed (i.e., splined) to input shaft 60 for rotation therewith. Thus, clutch hub 82 and drum 68 are capable of rotating relative to one another and form an internal chamber therebetween. Disposed within the internal chamber are two sets of alternatively interleaved friction clutch plates that are operable for transferring torque from input shaft 60 through clutch hub 82 to drum 68 and, ultimately, to front output shaft 76 in response to a clutch "engagement" force applied thereto. One set of clutch plates, referred to as inner clutch plate 84, are mounted (i.e., splined) for rotation with clutch hub 82 while the second set of clutch plates, referred to as outer clutch plates 86, are mounted (i.e., splined) for rotation with drum 68. In addition, a reaction plate 88 is mounted on or integral with one end of clutch hub 82. In addition, an apply plate 90 is rotatable with clutch hub 68 and yet is axially movable with respect to interleaved friction clutch plates 84 and 86. Thus, apply plate 90 acts as a pressure plate for compressing the interleaved clutch so as to cause drive torque to be transferred through clutch assembly 45 as a function of the clutch engagement force exerted on apply plate 90 by power-operated actuator 46.

Power-operated actuator 46 is a ball-screw actuator 92 which operatively engages apply plate 90 and is controlled by controller 42 to selectively control the amount of torque transferred through clutch assembly 45. Ball-screw actuator 92 provides a concentrically-mounted clutch actuator that reduces the mechanical and frictional components when compared to prior art actuators while further directly transferring rotational movement of the motor output to axial movement of apply plate 90 to provide more precise and repeatable and easily controlled reaction plate movement.

In general, ball-screw actuator 92 includes an electric motor 100 having a fixed stator 102 and a rotary output shaft 104, a screw 106, and a plurality of circumferentially spaced balls 108. Electric motor 100, screw 106, and balls 108 are each concentrically mounted with one another and about output shaft 62. Screw 106 is mounted within housing 56 for axial, non-rotational movement relative thereto. A thrust bearing 110 is disposed between the application face surfaces of screw 106 and apply plate 90 to permit rotation of apply plate 90 relative to screw 106. A spring 112 is located between hub 82 and apply plate 90 for normally exerting a return biasing a force on apply plate 90.

In operation, controller 42 selectively delivers current to electric motor 100 which causes motor 100 to rotate its output shaft 104. Motor output shaft 104 has helical grooves formed on its outer circumferential surface while screw 106 has helical grooves formed on its inner circumferential surface. Balls 108 are disposed within the grooves causing axial displacement of lead screw 106 toward or away from apply plate 90 in response to direction of rotation of motor output shaft 104. In turn, axial displacement of lead screw 106 causes corresponding movement of apply plate 90 and the desired increase or decrease in the frictional engagement between interleaved clutch plates 84 and 86. Thus, control of the direction and amount of rotation of shaft 104 controls the magnitude of the clutch engagement force exerted on clutch assembly 45.

In view of the above arrangement, electric motor output shaft 104 acts as the input to the ball-screw operator which yields a mechanically simple system that eliminates more complex mechanical designs previously used in the art including gears and/or linkages. As each of the mechanical components of the actuator contain friction elements, the elimination of these components and the more simple design provided by the present invention reduces the overall friction and therefore increases the efficiency of the assembly. Increased efficiency is translated into more economical motors and more accurate clutch torque estimation. The novel annular packaging of motor 100 and ball-screw actuator 92 permits the outer diameter of motor 100 to be grounded on housing 56. Those skilled in the art will appreciate that a variety of electric motors may be used including a dc brush, dc brushless, and stepper motors.

Figure 4:
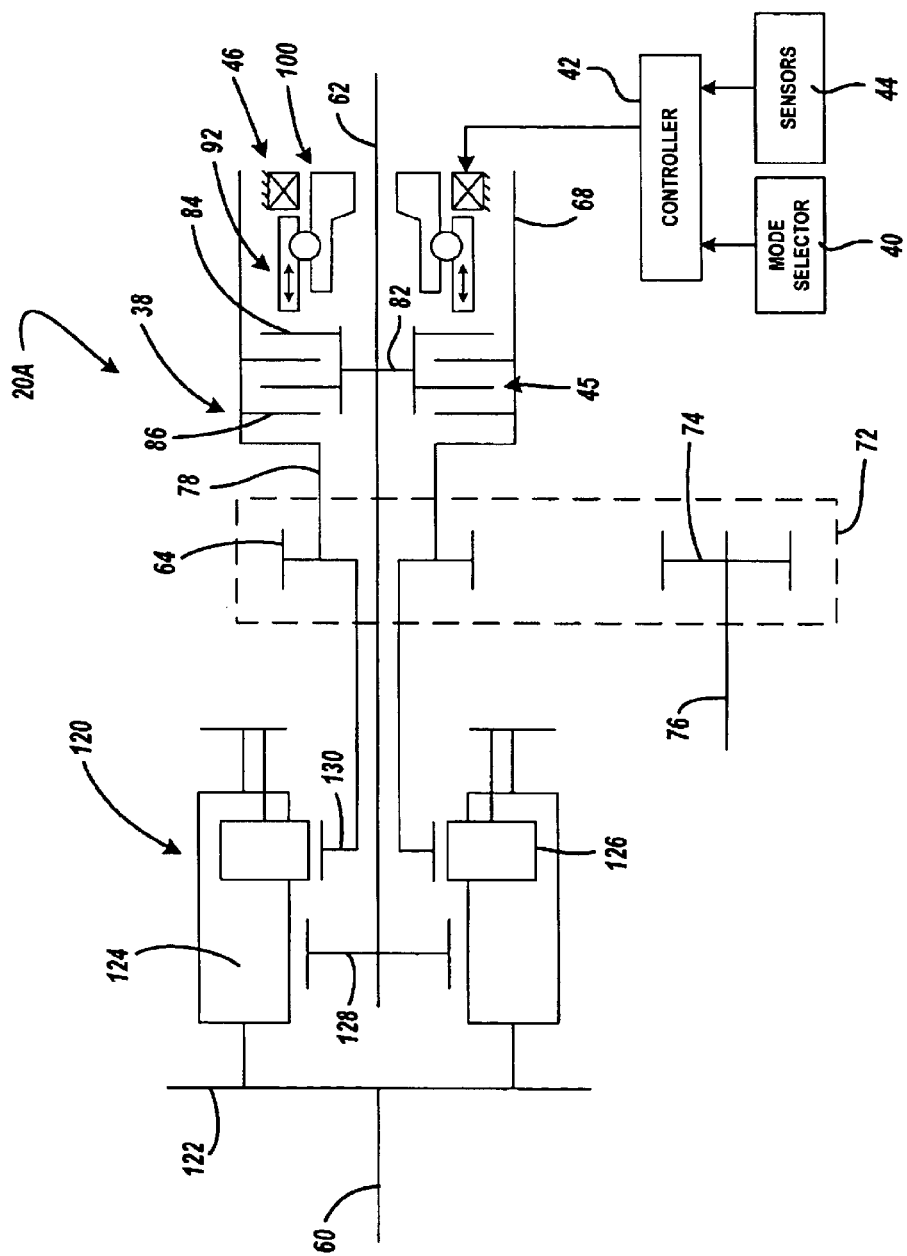
FIGS. 4 and 5 are schematic illustrations of transfer cases according to alternative embodiments of the present invention.

In addition to the on-demand versions of the power transfer system previously shown, the present invention is likewise adapted for use in alternative four-wheel drive vehicles. Referring to FIG. 4, a full-time 4WD version of a transfer case 20A is shown to now include an interaxle differential 120. Differential 120 is operable to transfer drive torque from input shaft 60 to both front and rear output shafts 76 and 62, respectively, while permitting speed differentiation therebetween. In addition, transfer clutch 38 is operably arranged between the outputs of interaxle differential 120 to bias the torque distribution therebetween. Preferably, mode selector 40 permits selection of an adaptive full-time four-wheel drive mode and a locked four-wheel drive mode. When the adaptive full-time four-wheel drive mode is selected, controller 42 controls the degree of actuation of transfer clutch 38 for varying the torque bias and limiting interaxle speed differentiation (i.e., slip) as a function of the sensor input signals. In contrast, when the locked four-wheel drive mode is selected, transfer clutch 38 is fully actuated and maintained in its lock-up condition such that interaxle differential 120 is locked and the output shafts are, in effect, rigidly coupled together.

Interaxle differential 120 is shown to include a carrier unit 122 from which meshed pairs of long pinions 124 and short pinions 126 are rotatably supported. Long pinions 124 are also meshed with a first sun gear 128 that is fixed for rotation with rear output shaft 62. Short pinions 126 are shown to be meshed with a second sun gear 130 that is fixed for rotation with drive sprocket 64. Power-operated actuator 46 is schematically shown in FIG. 4 to include ball screw operator 92 and electric motor 100 which are operably arranged on shaft 62 similar to that shown in FIGS. 2 and 3.

Figure 5:
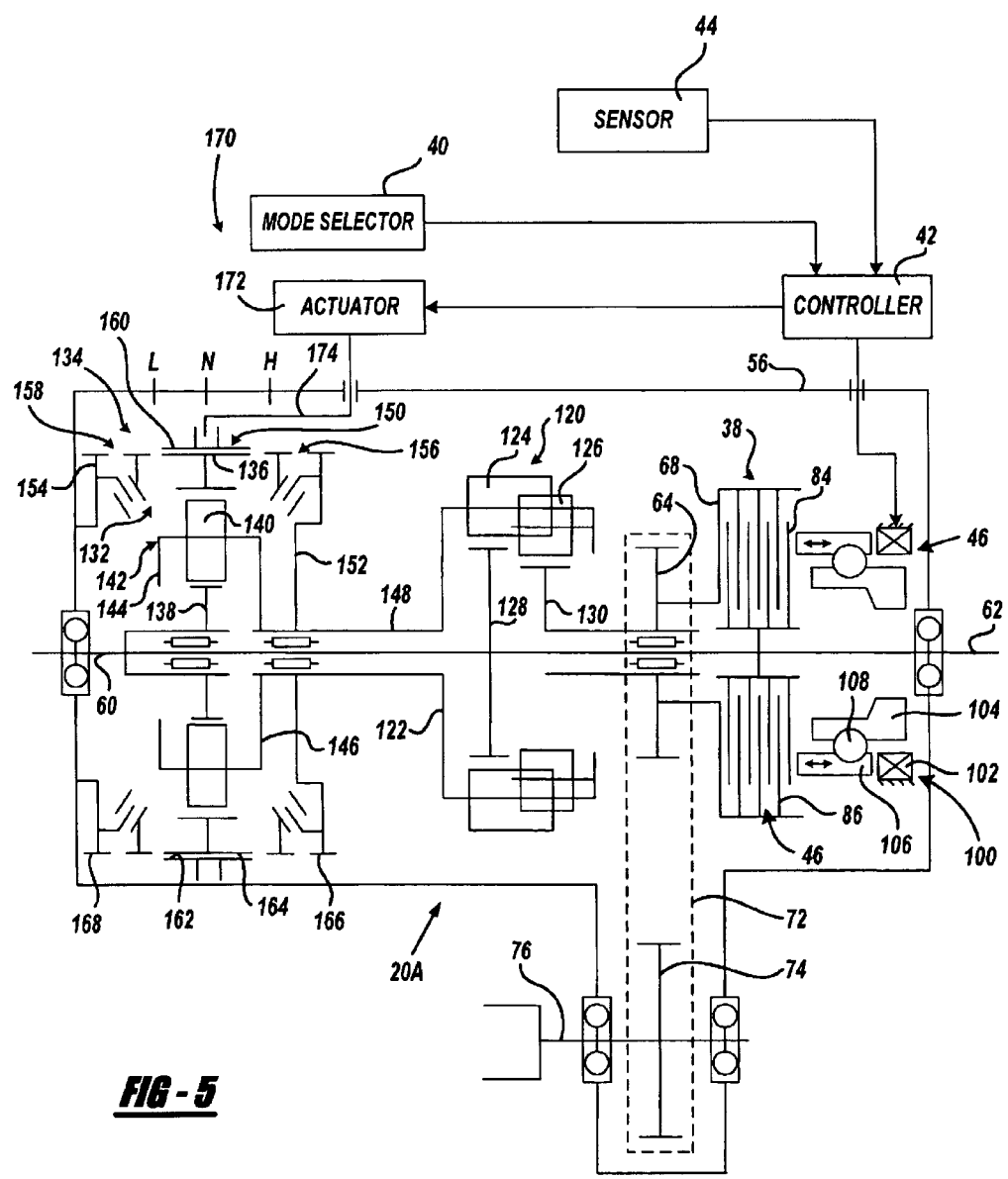

Referring now to FIG. 5, transfer case 20A of FIG. 4 is now shown to be further equipped with a two-speed planetary gear assembly 132 and a synchronized range shift system 134. Planetary gear assembly 132 includes a ring gear 136, a sun gear 138 fixed for rotation with input shaft 60, and a set of planet gears 140 which are each rotatably supported from a planet carrier 142 and meshed with sun gear 138 and ring gear 136. Planet carrier 142 is shown to include a front carrier ring 144 interconnected to a rear carrier ring 146. Rear carrier ring 146 of planet carrier 142 is fixed for rotation with pinion carrier 122 of interaxle differential 120 via a transfer shaft 148.

Planetary gear assembly 132 functions as a two-speed gear reduction unit which, in cooperation with a range clutch 150 of synchronized range shift mechanism 134, is operable to establish a first or high-range drive connection between input shaft 60 and carrier 142 by coupling ring gear 136 for rotation with a first clutch plate 152 that is fixed to transfer shaft 148 for rotation with planet carrier 142. When the first drive connection is established, ring gear 136 is effectively coupled for rotation with planet carrier 142. Thus, the first drive connection establishes a high-range drive mode in which planet carrier 142 is driven by input shaft 60 at a first (i.e., direct) speed ratio. Likewise, a second or low-range drive connection is established between input shaft 60 and planet carrier 142 by coupling ring gear 136 to a second clutch plate 154 that is fixed to housing 56. When the second drive connection is established, ring gear 136 is braked against rotation and planet carrier 142 is driven by input shaft 60. Thus, the second drive connection establishes a low-range mode in which carrier 142 is driven at a second (i.e., reduced) speed ratio with respect to input shaft 60. A neutral mode is established when range clutch 150 uncouples ring gear 136 from both first clutch plate 152 and second clutch plate 154 such that carrier 142 is not driven by input shaft 60. As will be detailed, synchronized range shift mechanism 134 is operable for permitting transfer case 20A to be shifted "on-the-move" between its high-range and low-range drive modes.

With continued reference of FIG. 5, synchronized range shift mechanism 134 is shown to include range clutch 150, a first synchronizer assembly 156 that is disposed between range clutch 150 and first clutch plate 152, and a second synchronizer assembly 158 that is disposed between range clutch 150 and second clutch plate 154. Range clutch 150 includes a range sleeve 160 having a set of internal longitudinal splines 162 maintained in constant mesh with external longitudinal splines 164 formed on an outer surface of ring gear 136. Thus, range sleeve 160 is mounted for rotation with ring gear 136 and is further supported for bidirectional sliding movement relative thereto. With range sleeve 160 in a neutral position (denoted by position line "N") its spline teeth 162 are disengaged for mesh engagement with clutch teeth 166 on first clutch plate 152 and clutch teeth 168 on second clutch plate 154. First synchronizer assembly 156 is operable for causing speed synchronization between input shaft 60 and planet carrier 142 in response to movement of range sleeve 160 from its N position toward a high-range position (denoted by position line "H"). Once the speed synchronization process is completed, spline teeth 162 on range sleeve 160 are permitted to move through first synchronizer 156 and into meshed engagement with clutch teeth 166 on first clutch plate 152.

With range sleeve in its H position, it couples ring gear 136 to first clutch plate 152 such that planet carrier 142 is coupled to rotate at the same speed as input shaft 60 for establishing the first drive connection therebetween. Second synchronizer 158 is operable to cause speed synchronization between ring gear 136 and housing 56 in response to movement of range sleeve 160 from its N position toward a low-range position (denoted by position line "L"). Once speed synchronization is complete, spline teeth 162 on range sleeve 160 move through second synchronizer 158 and into meshed engagement with clutch teeth 168 on second clutch plate 154. With range sleeve 160 positioned in its L position, ring gear 136 is coupled to housing 56 such that planet carrier 142 is driven at a reduced speed ratio relative to input shaft 60, thereby establishing the second drive connection and the low-range drive mode.

To provide means for moving range sleeve 160 between its three range positions, transfer case 20A includes a shift system 170 which is shown schematically to include a power-operated actuator 172 which receives control signals from controller 42. Actuator 172 is operable for controlling movement of a shift fork 174 which, in turn, moves range sleeve 136 between its three distinct range positions.

Figure 6:
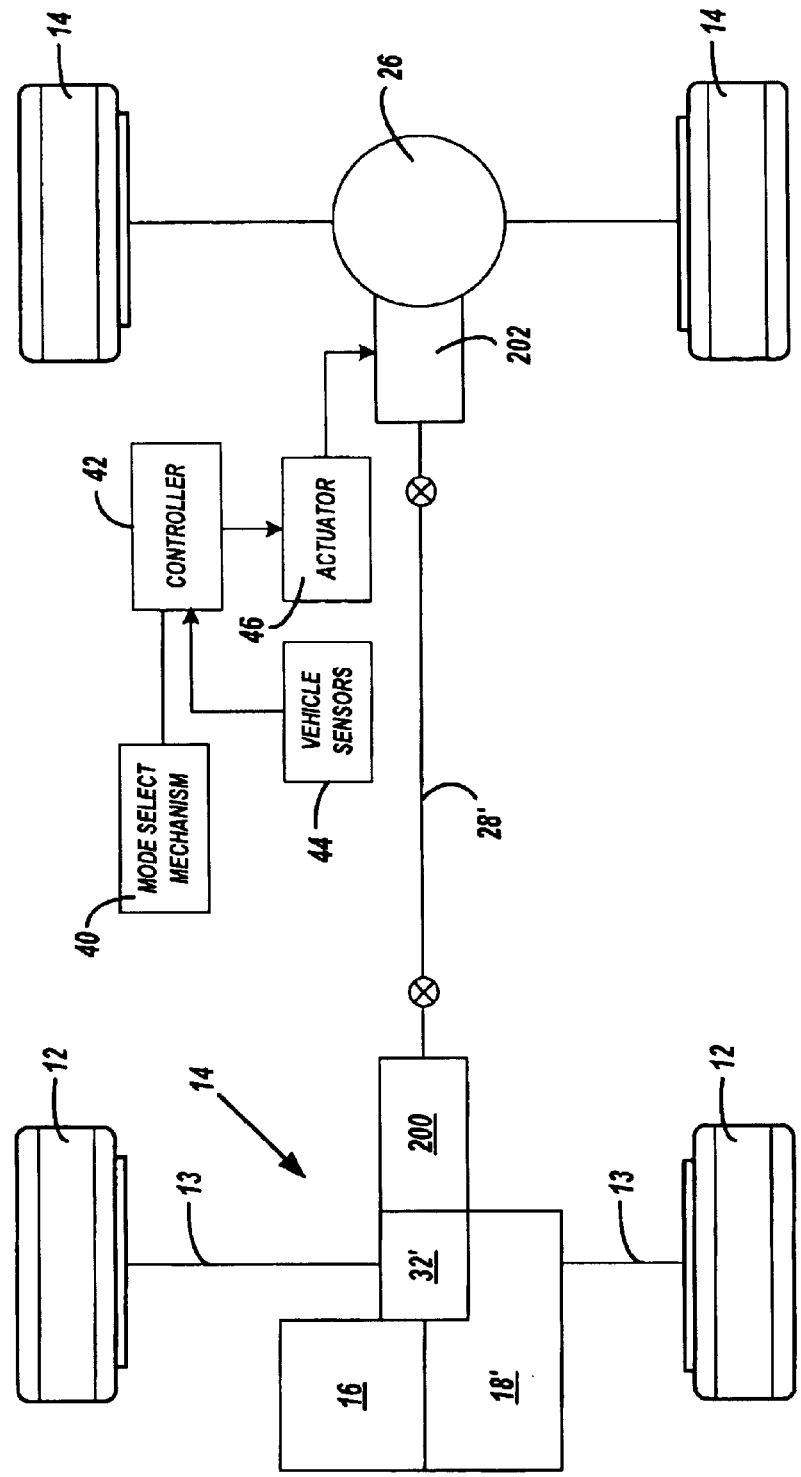
FIG. 6 is a schematic representation of an alternative four-wheel drive vehicle having the power transfer system of the present invention incorporated therein.

To illustrate an alternative power transmission device to which the present invention is applicable, FIG. 6 schematically depicts a front-wheel based four-wheel drive layout. In particular, engine 16 drives a multi-speed transmission 18' having an integrated front differential unit 32' for driving front wheels 12 via axle shafts 13. A transfer unit 200 is also driven by transmission 18' for delivering drive torque to the input member of an in-line torque transfer coupling 202 via a drive shaft 28'. In particular, the input member of transfer coupling 202 is coupled to drive shaft 28' while its output member is coupled to a drive component of rear differential 26. Accordingly, when sensors 44 indicate the occurrence of a front wheel slip condition, controller 42 adaptively controls actuation of torque coupling 202 such that drive torque is delivered "on-demand" to rear wheels 14. It is contemplated that torque transfer coupling 202 would include a multi-plate clutch assembly 45 and a ball screw actuator 92 that are generally similar in structure and function to that of any of the devices previously described herein. While shown in association with rear differential 26, it is contemplated that torque coupling 202 could be operably located for transferring drive torque from transfer unit 200 to drive shaft 28'.

Figure 7:
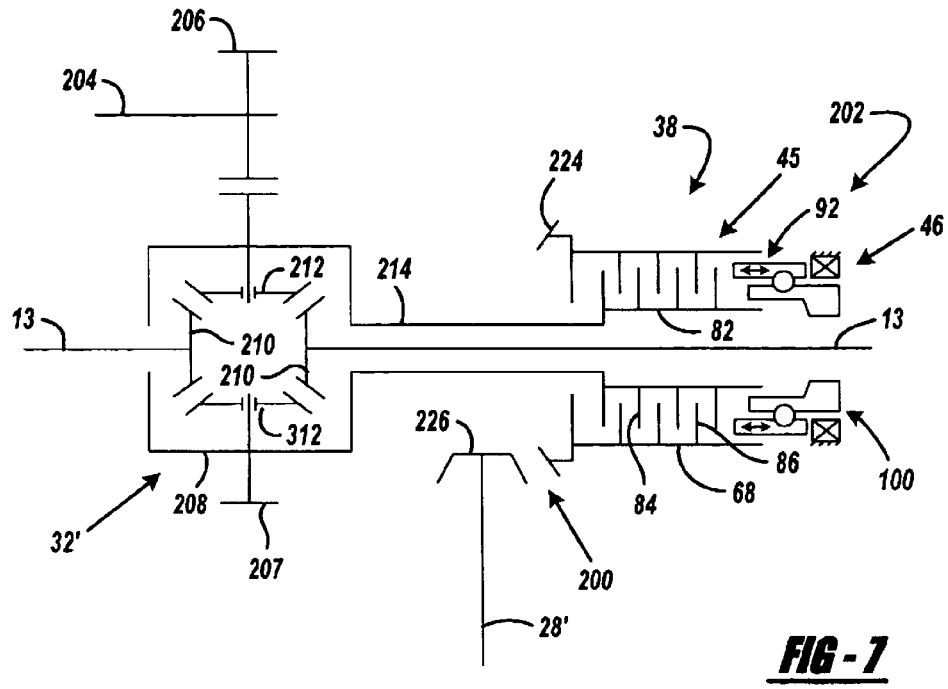
FIGS. 7 and 8 are schematic illustrations of on-demand power transfer arrangement associated with the vehicle shown in FIG. 7.

Referring now to FIG. 7, torque coupling 202 is schematically illustrated in association with an on-demand four-wheel drive system based on a frontwheel drive vehicle similar to that shown in FIG. 6. In particular, an output shaft 204 of transaxle 18' is shown to drive an output gear 206 which, in turn, drives an input gear 207 fixed to a carrier 208 associated with front differential unit 32'. To provide drive torque to front wheels 12, front differential unit 32' includes a pair of side gears 210 that are connected to front wheels 14 via axleshafts 13. Differential unit 32' also includes pinions 212 that are rotatably supported on pinion shafts fixed to carrier 208 and which are meshed with side gears 210. A transfer shaft 214 is provided to transfer drive torque from carrier 208 to a clutch hub 82 associated with a multi-pate clutch assembly 45. Clutch assembly 45 includes drum 68 and a clutch pack having interleaved clutch plates operably connected between hub 82 and drum 68.

Transfer unit 200 is a right-angled drive mechanism including a ring gear 224 fixed for rotation with drum 68 of clutch assembly 38 which is meshed with a pinion gear 226 fixed for rotation with drive shaft 28'. As seen, ball screw clutch actuator 46 is schematically illustrated for controlling actuation of clutch assembly 28. According to the present invention, actuator 46 is similar to, and includes, ball screw operator 92 and motor 100. In operation, drive torque is transferred from the primary (i.e., front) driveline to the secondary (i.e., rear) driveline in accordance with the particular mode selected by the vehicle operator via mode selector 40. For example, if the on-demand 4WD mode is selected, controller 42 modulates actuation of clutch actuator 46 in response to the vehicle operating conditions detected by sensors 44 by varying the value of the electric control signal sent to motor 100. In this manner, the level of clutch engagement and the amount of drive torque that is transferred through the clutch pack to the rear driveline through transfer unit 200 and drive shaft 28' is adaptively controlled. Selection of the locked or part-time 4WD mode results in full engagement of clutch assembly 45 for rigidly coupling the front driveline to the rear driveline. In some applications, mode selector 40 may be eliminated such that only the on-demand 4WD mode is available so as to continuously provide adaptive traction control without input from the vehicle operator.

Figure 8:
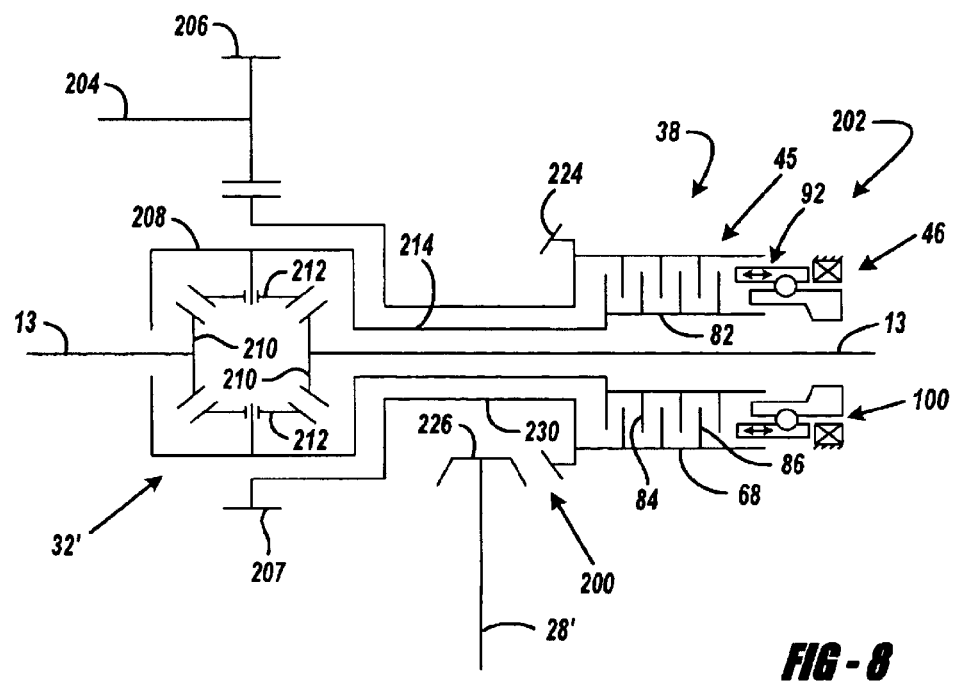

FIG. 8 illustrates a modified version of FIG. 7 wherein an on-demand four-wheel drive system based on a rear-wheel drive motor vehicle that is arranged to normally deliver drive torque to rear wheels 14 while selectively transmitting drive torque to front wheels 12 through torque coupling 202. In this arrangement, drive torque is transmitted directly from transmission output shaft 204 to transfer unit 200 via a drive shaft 230 interconnecting input gear 207 to ring gear 224. To provide drive torque to front wheels 12, torque coupling 202 is now shown operably disposed between drive shaft 230 and transfer shaft 214. In particular, clutch assembly 45 is arranged such that drum 68 is driven with ring gear 224 by drive shaft 230. As such, actuation of torque coupling 202 functions to transfer torque from drum 68 through the clutch pack to hub 82 which, in turn, drives carrier 208 of front differential unit 32' via transfer shaft 214.

Figure 9:
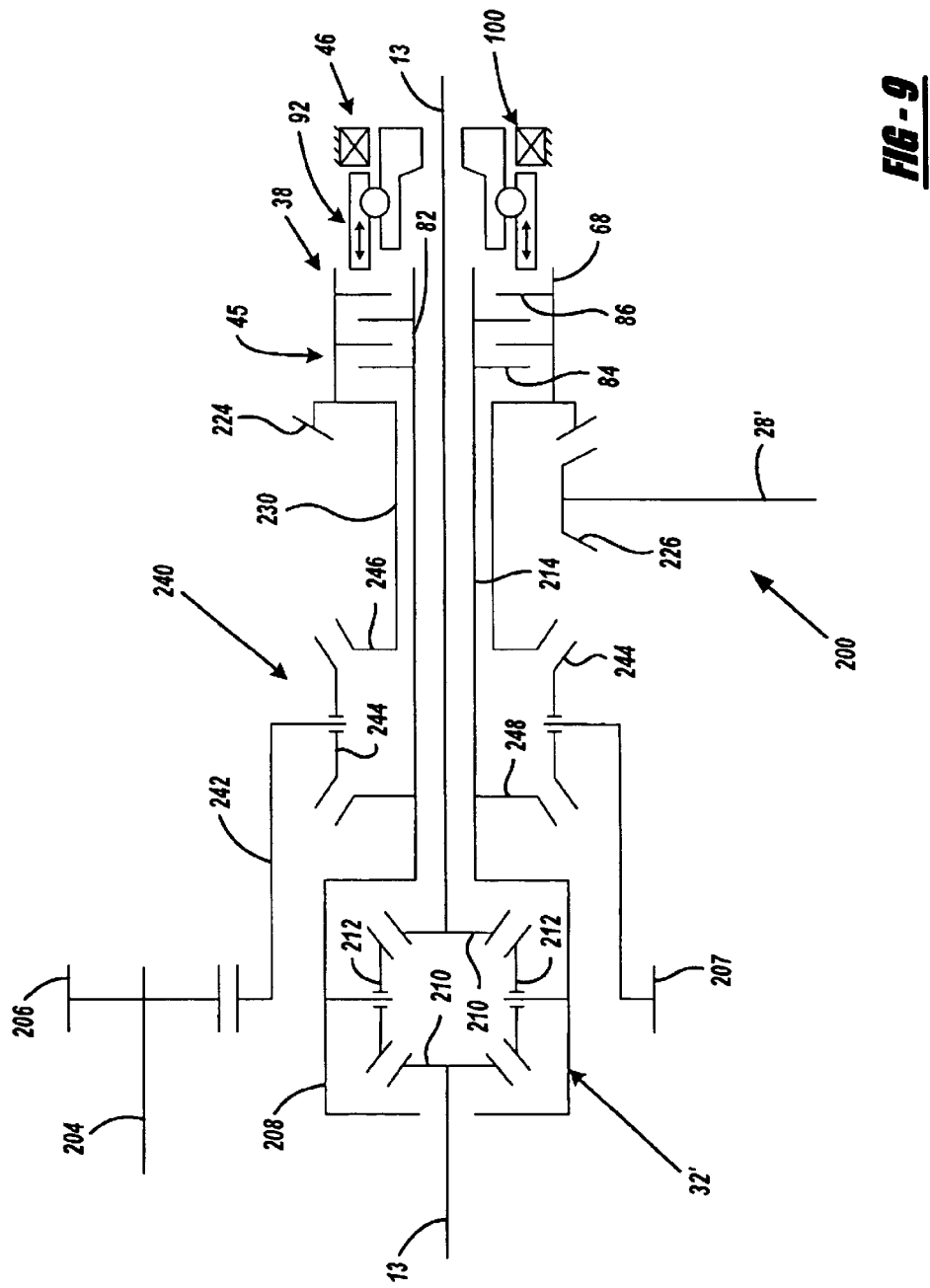
FIG. 9 is a schematic illustration of a full-time power transfer arrangement for the vehicle shown in FIG. 7.

In addition to the on-demand 4WD systems shown previously, the power transmission (ball screw clutch actuator and clutch assembly) technology of the present invention can likewise be used in full-time 4WD systems to adaptively bias the torque distribution transmitted by a center or "interaxle" differential unit to the front and rear drivelines. For example, FIG. 9 schematically illustrates a full-time four-wheel drive system which is generally similar to the on-demand four-wheel drive system shown in FIG. 8 with the exception that an interaxle differential unit 240 is now operably installed between carrier 208 of front differential unit 32' and transfer shaft 214. In particular, output gear 207 is fixed for rotation with a carrier 242 of interaxle differential 240 from which pinion gears 244 are rotatably supported. A first side gear 246 is meshed with pinion gears 244 and is fixed for rotation with drive shaft 230 so as to be drivingly interconnected to the rear driveline through transfer unit 200. Likewise, a second side gear 248 is meshed with pinion gears 248 and is fixed for rotation with carrier 208 of front differential unit 32' so as to be drivingly interconnected to the front driveline. In operation, when sensor 44 detects a vehicle operating condition, such as excessive interaxle slip, controller 42 adaptively controls activation of motor 100 associated with ball screw actuator 46 for controlling engagement of clutch assembly 38 and thus the torque biasing between the front and rear driveline.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A torque transfer mechanism for use in a motor vehicle having an engine and first and second sets of wheels, comprising:
   an input shaft driven by the engine;
   a first output shaft driving the first set of wheels;
   a second output shaft driving the second set of wheels;
   a transfer unit driving said second output shaft; an interaxle differential having a carrier driven by said input shaft, a first output sun gear driving said first output shaft, a second output sun pear driving said transfer unit, and meshed pairs of planet pears for transferring drive torque from said carrier to said first and second sun gears and permitting relative rotation therebetween;
   a clutch pack operably disposed between said first and second sun gears;
   an apply plate moveable relative to said clutch pack between a first position and a second position, said apply plate is operable in its first position to apply a minimum clutch engagement force on said clutch pack, and said apply plate is operable in its second position to apply a maximum clutch engagement force on said clutch pack;
   a clutch actuator for controlling movement of said apply plate between its first and second positions, said clutch actuator including an electric motor having an output shaft with first threads formed thereon, a leadscrew formed with second threads which are arranged in facing relation to said first threads, and balls disposed between said first and second threads, wherein rotation of said motor output shaft causes said leadscrew to axially translate for producing a linearly directed output force, said output force being exerted on said apply plate to move said apply plate between its first and second positions; and
   a control system for controlling actuation of said electric motor.

2. The torque transfer mechanism of claim 1 wherein said electric motor is mounted concentrically relative to said first output shaft.

3. The torque transfer mechanism of claim 1 wherein an adaptive full-time four-wheel drive mode is established by said control system controlling actuation of said electric motor to vary movement of said leadscrew in response to at least one operating characteristic of the motor vehicle detected by a sensor and supplied to said control system as a sensor input signal.

4. The torque transfer mechanism of claim 1 defining a transfer case wherein said first output shaft drives the first set of wheels via a first driveline and said second output shaft drives the second set of wheels via a second driveline.

5. The torque transfer mechanism of claim 1 defining a power transfer unit wherein said first output shaft is coupled to a drive shaft associated with a first driveline via a right-angle drive unit, and wherein said second output shaft drives a differential assembly which is connected to the second set of wheels.

6. A motor vehicle, comprising:
   a powertrain for generating drive torque;
   a first driveline including a first differential connecting a first set of wheels;
   a second driveline including a second differential connecting a second set of wheels;
   a torque transfer mechanism including a third differential and a transfer clutch, said third differential having a carrier receiving drive torque from said powertrain, a first side pear operably connected to said first differential, a second side pear operably connected to said second differential, and pinion gears supported by said carrier and meshed with said first and second side gears for transferring drive torque from said carrier to said first and second side gears while permitting speed differentiation therebetween, said transfer clutch having a clutch pack operably disposed between said first and second side gears, an apply plate for exerting a clutch engagement force on said clutch pack, and a clutch actuator for moving said apply plate between first and second positions corresponding to minimum and maximum clutch engagement forces, said clutch actuator includes an electric motor having a threaded shaft, a threaded leadscrew coaxially arranged relative to said threaded motor shaft, and rollers disposed between the threads in said motor shaft and said leadscrew, wherein rotation of said motor shaft causes axial movement of said leadscrew for moving said apply plate between its first and second positions; and
   a controller for controlling actuation of said electric motor.

7. The motor vehicle of claim 6 wherein said first side gear of said third differential drives a right-angle drive unit for transferring drive torque to said first differential.

8. The motor vehicle of claim 7 wherein a propshaft interconnects said drive unit to said first differential.

9. A transfer case for use in a full-time four-wheel drive motor vehicle having an engine and first and second drivelines, comprising:
   an input shaft driven by the engine;
   a first output shaft driving the first driveline;
   a second output shaft driving the second driveline;
   a transfer unit driving said second output shaft;
   an interaxle differential having an input driven by said input shaft, a first output driving said first output shaft, a second output driving said transfer unit, and a gear arrangement for transferring drive torque from said input to said first and second outputs and permitting relative rotation therebetween, wherein said input of said interaxle differential is a carrier, said first output is a first sun gear, said second output is a second sun gear, and said gear arrangement includes meshed pairs of planet pears rotatably supported from said carrier that are meshed with said first and second sun gears;
   a clutch pack operably disposed between said first and second outputs;

a leadscrew moveable relative to said clutch pack between a first position and a second position, said leadscrew is operable in its first position to apply a minimum clutch engagement force on said clutch pack, and said leadscrew is operable in its second position to apply a maximum clutch engagement force on said clutch pack;

a clutch actuator for controlling movement of said leadscrew between its first and second positions, said clutch actuator including an electric motor having an output shaft with first threads formed thereon, said leadscrew having second threads which are arranged in facing relation to said first threads, and balls disposed between said first and second threads, wherein the direction and amount of rotation of said motor output shaft controls corresponding axial movement of said leadscrew; and a control system for controlling actuation of said electric motor.

10. The transfer case of claim 9 wherein said electric motor is mounted concentrically relative to said first output shaft.

11. The transfer case of claim 9, wherein an adaptive full-time four-wheel drive mode is established by said control system controlling actuation of said electric motor to varying movement of said leadscrew in response to at least one operating characteristic of the motor vehicle detected by a sensor and supplied to said control system as a sensor input signal.

12. The transfer case of claim 9 wherein said first output shaft drives a first set of wheels via said first driveline and said second output shaft drives a second set of wheels via said second driveline.

13. A torque transfer mechanism for use in a motor vehicle having an engine and first and second sets of wheels, comprising:

an input driven by the engine;

a first output driving the first set of wheels;

a second output driving the second set of wheels;

an interaxle differential having carrier driven by said input, a first side gear driving said first output, a second side gear driving said second output, and pinion gears supported on said carrier and meshed with said first and second side gears for transferring drive torque from said input to said first and second outputs and permitting relative rotation therebetween;

a clutch pack operably disposed between said first and second outputs;

an apply plate moveable relative to said clutch pack between a first position and a second position, said apply plate is operable in its first position to apply a minimum clutch engagement force on said clutch pack, and said apply plate is operable in its second position to apply a maximum clutch engagement force on said clutch pack;

a clutch actuator for controlling movement of said apply plate between its first and second positions, said clutch actuator including an electric motor having an output shaft with first threads formed thereon, a leadscrew formed with second threads which are arranged in facing relation to said first threads, and balls disposed between said first and second threads, wherein rotation of said motor output shaft causes said leadscrew to axially translate for producing a linearly directed output force, said output force being exerted on said apply plate to move said apply plate between its first and second positions; and a control system for controlling actuation of said electric motor.

14. The torque transfer mechanism of claim 13 wherein said electric motor is mounted concentrically relative to said first output.

15. The torque transfer mechanism of claim 13 wherein an adaptive full-time four-wheel drive mode is established by said control system controlling actuation of said electric motor to vary movement of said leadscrew in response to at least one operating characteristic of the motor vehicle detected by a sensor and supplied to said control system as a sensor input signal.

16. The torque transfer mechanism of claim 13 defining a transfer case wherein said input is an input shaft, said first output is a first output shaft driving a first driveline connected to the first set of wheels, said second output is a second output shaft driving a second driveline connected to the second set of wheels, and further comprising a transfer unit interconnecting said second side gear to said second output shaft.

17. The torque transfer mechanism of claim 13 defining a power transfer unit wherein said first output includes a first transfer shaft driven by said first side gear and a right-angle drive unit for transferring drive torque from said first transfer shaft to the first set of wheels, and wherein said second output includes a second transfer shaft driven by said second side gear and a differential for transferring drive torque from said second transfer shaft to the second set of wheels.

18. The torque transfer mechanism of claim 17 wherein said clutch pack is operably disposed between said first and second transfer shafts and wherein said electric motor is coaxially aligned relative to at least one of said first and second transfer shafts.

19. A motor vehicle, comprising:

a powertrain for generating drive torque;

a first driveline including a first differential connecting a first set of wheels;

a second driveline including a second differential connecting a second set of wheels;

a torque transfer mechanism including a third differential and a transfer clutch, said third differential having a carrier receiving drive torque from said powertrain, a first sun gear operably connected to said first differential, a second sun gear operably connected to said second differential, and meshed pairs of pinions for transferring drive torque from said carrier to said first and second side gears while permitting speed differentiation therebetween, said transfer clutch having a clutch pack operably disposed between said first and second side gears, an apply plate for exerting a clutch engagement force on said clutch pack, and a clutch actuator for moving said apply plate between first and second positions corresponding to minimum and maximum clutch engagement forces, said clutch actuator includes an electric motor having a threaded shaft, a threaded leadscrew coaxially arranged relative to said threaded motor shaft, and rollers disposed between the threads in said motor shaft and said leadscrew, wherein rotation of said motor shaft causes axial movement of said leadscrew for moving said apply plate between its first and second positions; and a controller for controlling actuation of said electric motor.

* * * * *